(12) United States Patent
Li et al.

(10) Patent No.: US 11,167,643 B2
(45) Date of Patent: Nov. 9, 2021

(54) ELECTRIC-DRIVE VEHICLES, POWERTRAINS, AND LOGIC FOR COMPREHENSIVE VEHICLE CONTROL DURING TOWING

(71) Applicant: GM GLOBAL TECHNOLOGY OPERATIONS LLC, Detroit, MI (US)

(72) Inventors: Dongxu Li, Troy, MI (US); Lei Hao, Troy, MI (US)

(73) Assignee: GM Global Technology Operations LLC, Detroit, MI (US)

(*) Notice: Subject to any disclaimer, the term of this patent is extended or adjusted under 35 U.S.C. 154(b) by 225 days.

(21) Appl. No.: 16/580,565

(22) Filed: Sep. 24, 2019

(65) Prior Publication Data

US 2021/0086620 A1 Mar. 25, 2021

(51) Int. Cl.
| | |
|---|---|
| *B60L 3/00* | (2019.01) |
| *G07C 5/08* | (2006.01) |
| *B60L 15/20* | (2006.01) |
| *B60L 58/12* | (2019.01) |
| *B60L 58/26* | (2019.01) |

(52) U.S. Cl.
CPC .............. *B60L 3/0046* (2013.01); *B60L 15/20* (2013.01); *B60L 58/12* (2019.02); *B60L 58/26* (2019.02); *G07C 5/0808* (2013.01); *G07C 5/0816* (2013.01); *B60Y 2200/91* (2013.01); *B60Y 2200/92* (2013.01)

(58) Field of Classification Search
CPC ........ B60L 3/0046; B60L 58/12; B60L 58/26; B60L 15/20; G07C 5/0808; G07C 5/0816; B60Y 2200/91; B60Y 2200/92

USPC .......................................................... 701/22
See application file for complete search history.

(56) References Cited

U.S. PATENT DOCUMENTS

| | | | |
|---|---|---|---|
| 8,700,284 B2 | 4/2014 | Wojtkowicz et al. | |
| 8,862,283 B2 | 10/2014 | Kahler et al. | |
| 9,193,232 B2 | 11/2015 | Huntzicker | |
| 10,272,917 B2 | 4/2019 | Bramson et al. | |
| 2012/0072064 A1* | 3/2012 | Kumazaki | F16H 61/0213 701/22 |
| 2013/0066494 A1* | 3/2013 | Kamijo | B60W 30/20 701/22 |

* cited by examiner

*Primary Examiner* — Gertrude Arthur Jeanglaude
(74) *Attorney, Agent, or Firm* — Quinn IP Law

(57) ABSTRACT

Presented are intelligent vehicles and control logic for provisioning comprehensive tow features, methods for manufacturing/operating such vehicles, and electric-drive vehicles with tow features for protecting the vehicle's powertrain and electrical components during towing. A method for controlling operation of an electric-drive vehicle includes a vehicle controller verifying initiation of a towing operation for the vehicle, and responsively determining if there is a drive system failure preventing the vehicle's traction motor from electrically connecting with its traction battery pack. If there is no drive system failure, the controller determines if the speed of the traction motor during towing exceeds a calibrated base speed; if so, the controller commands a power inverter to electrically connect the traction motor to the traction battery pack. If, however, the towed motor speed does not exceed the calibrated base speed, the controller responsively commands the power inverter to disconnect the traction motor from the battery pack.

20 Claims, 3 Drawing Sheets

ELECTRIC-DRIVE VEHICLES, POWERTRAINS, AND LOGIC FOR COMPREHENSIVE VEHICLE CONTROL DURING TOWING

INTRODUCTION

The present disclosure relates generally to hybrid and electric motor vehicles. More specifically, aspects of this disclosure relate to intelligent motor vehicles with electric-drive powertrains and logic for electrical system control during vehicle towing.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, road wheels, etc.). Automobiles have historically been powered by a reciprocating-piston type internal combustion engine (ICE) assembly due to its ready availability and relatively inexpensive cost, light weight, and efficiency. Such engines include compression-ignited (CI) diesel engines, spark-ignited (SI) gasoline engines, two, four, and six-stroke architectures, and rotary engines, as some non-limiting examples. Hybrid electric and full electric vehicles, on the other hand, utilize alternative power sources to propel the vehicle, such as electric motor generator units (MGU), and therefore minimize or eliminate reliance on a fossil-fuel based engine for tractive power.

A full electric vehicle (FEV)—colloquially identified as an "electric car"—is a type of electric-drive vehicle configuration that altogether removes the internal combustion engine and attendant peripheral components from the powertrain system, relying solely on electric traction motors for propulsion and for supporting accessory loads. The engine assembly, fuel supply system, and exhaust system of an ICE-based vehicle are replaced with a single or multiple traction motors, a traction battery back, and battery cooling and charging electronics in an FEV. Hybrid electric vehicle (HEV) powertrains, in contrast, employ multiple sources of tractive power to propel the vehicle, most commonly operating an internal combustion engine assembly in conjunction with a battery-powered or fuel-cell-powered electric motor. Since hybrid vehicles are able to derive their power from sources other than the engine, HEV engines may be turned off, in whole or in part, while the vehicle is propelled by the electric motor(s).

Most commercially available hybrid electric and full electric (collectively "electric-drive") vehicles employ a rechargeable traction battery pack to store and supply the requisite power for operating the powertrain's motor/generator unit(s). In order to generate tractive power with sufficient vehicle range, speed, and responsiveness, a traction battery pack is significantly larger, more powerful, and higher in capacity than a standard 12-volt starting, lighting, and ignition (SLI) battery. A high-voltage (HV) electrical system helps to govern the transfer of electricity between an REV/FEV's traction motor and the onboard traction battery pack. HV electric systems often employ a front-end, DC-to-DC electric power converter that is electrically connected to the vehicle's traction battery pack(s) in order to increase the supply of voltage to a high-voltage main direct current (DC) bus and an electronic power inverter. A high-frequency bulk capacitor may be arranged across the positive and negative terminals of the main DC bus to provide electrical stability and store supplemental electric energy. Operation and control of the multi-phase, synchronous MGUs may be accomplished by employing the power inverter module (PIM) to transform DC power to alternating current (AC) electric power using pulse-width modulated control signals output from a powertrain control module (PCM).

During vehicle use, it is occasionally necessary to have a motor vehicle towed, be it in a flat-tow operation (e.g., towed behind a recreational vehicle with front and rear vehicle wheels contacting the ground), an inclined-tow operation (e.g., towed behind an integrated tow truck with front or rear wheels elevated off the ground), or a bed-tow operation (e.g., towed on a flatbed truck with front and rear wheels elevated off the ground). Flat-towing or incline-towing an electric-drive vehicle, however, may raise concerns not present when the towed vehicle is placed on a truck bed or trailer because rotation of the road-contacting wheels may inadvertently drive the vehicle's traction motor(s). Driving a traction motor when the vehicle is towed and the motor is electrically disconnected from the battery pack may induce a counter electromotive force (EMF) that could potentially damage the HV system's bulk capacitor. On the other hand, driving a traction motor during vehicle towing when the motor is electrically connected to the battery pack may push the drive system into uncontrolled regenerative charging that generates unfettered heat and a large voltage supply across the HV electrical system that may cause damage to the PIM and individual cells within the traction battery pack.

SUMMARY

Presented herein are intelligent vehicle systems with attendant control logic for provisioning tow features for electric-drive vehicles, methods for making and methods for using such systems, and electric-drive vehicles with tow features for protecting the vehicle's powertrain and electrical components during towing. By way of example, and not limitation, there are presented comprehensive tow features for protecting battery electric vehicle (BEV) drive system components during vehicle towing, and for providing multi-system modulation protocols that depend on real-time drive system conditions. For this example, the design and control solutions may be based on electric drive system architecture, real-time towed vehicle and battery speed, battery operating status, etc. User-selectable options may be presented to a vehicle occupant to selectively enable system protection, emergency charging, and energy recovery depending on real-time drive system conditions. Disclosed intelligent vehicle systems and control logic ameliorate problems associated with driving an unpowered traction motor during vehicle towing, such as mitigating uncontrolled voltage and current generation that may otherwise damage the inverter and electrical system components, as well as mitigating damage to the traction battery pack and motor due to thermal runaways without sufficient cooling.

Aspects of this disclosure are directed to methods for making and methods for using any of the disclosed motor vehicles, automated vehicle systems, and/or vehicle tow control modules. In an example, a method is presented for governing operation of an electric-drive vehicle while the vehicle is being towed. The electric-drive vehicle includes a resident or remote vehicle controller, a powertrain system, and an electrical system. The powertrain system includes one or more traction motors that is/are operable to drive one or more vehicle wheels to thereby propel the vehicle. The electrical system includes a traction battery pack for powering the motor(s), power electronics for controlling operation of the battery pack and motor(s), and a power inverter module for modulating power flow to/from the battery pack and motor(s).

This representative method includes, in any order and in any combination with any of the above and below disclosed options and features: receiving, via the vehicle controller, an electronic tow signal indicating initiation of a towing operation for the electric-drive vehicle; determining, via the vehicle controller responsive to the received tow signal, if a drive system failure exists, the drive system failure preventing the traction motor from electrically connecting with the traction battery pack; determining, via the vehicle controller responsive to a determination that the drive system failure does not exist, if a towed motor speed of the traction motor during the towing operation exceeds a calibrated base speed; transmitting, via the vehicle controller responsive to a determination that the towed motor speed exceeds the calibrated base speed, a connect command signal to the power inverter to electrically connect the traction motor to the power electronics and/or traction battery pack; and transmitting, via the vehicle controller responsive to a determination that the towed motor speed does not exceed the calibrated base speed, a disconnect command signal to the power inverter to electrically disconnect the traction motor from the power electronics and/or traction battery pack.

Additional aspects of this disclosure are directed to electric-drive vehicles with comprehensive tow features for protecting the vehicle's powertrain and electrical components. As used herein, the terms "vehicle" and "motor vehicle" may be used interchangeably and synonymously to include any relevant vehicle platform, such as passenger vehicles (e.g., hybrid electric, full electric, fully and partially autonomous, etc.), commercial vehicles, industrial vehicles, tracked vehicles, off-road and all-terrain vehicles (ATV), motorcycles, farm equipment, watercraft, aircraft, etc. In an example, a motor vehicle is presented that includes a vehicle body with multiple road wheels and other standard original equipment. Also mounted to the vehicle body is a powertrain system with a prime mover, which may comprise one or more traction motors that operate alone or in conjunction with an internal combustion engine to drive one or more of the road wheels to thereby propel the vehicle. The vehicle is also equipped with a high-voltage electrical system composed of a traction battery pack that is operable to power the traction motor(s), and a power inverter that is operable to selectively electrically connect the traction battery pack to the traction motor(s).

Continuing with the discussion of the above example, the electric drive vehicle also includes a vehicle controller, which may be embodied as an electronic control unit or a network of distributed controllers or control modules that regulate operation of one or more resident vehicle systems. The vehicle controller is programmed to receive one or more electronic signals indicating initiation of a towing operation for the electric-drive vehicle, and responsively determine if a drive system failure exists that prevents the motor from electrically connecting with the battery pack. If the drive system failure does not exist, the vehicle controller determines if a real-time speed of the traction motor during the towing operation of the electric-drive vehicle exceeds a calibrated base speed. If it does, the controller commands the power inverter to electrically connect the traction motor to the power electronics and/or traction battery pack. Conversely, if the towed motor speed does not exceed the calibrated base speed, the vehicle controller commands the power inverter to electrically disconnect the traction motor from the power electronics and/or traction battery pack.

Additional aspects of the present disclosure are directed to techniques, algorithms, and logic for operating or manufacturing any of the disclosed vehicles, systems, and devices. Aspects of the present disclosure are also directed to electric-drive vehicle architectures and automated or autonomous control systems for governing operation of vehicle drive systems. Also presented herein are non-transitory, computer readable media storing instructions executable by at least one of one or more processors of one or more programmable control units, such as an electronic control unit (ECU) or control module, to govern operation of a disclosed vehicle, system, or device.

The above summary is not intended to represent every embodiment or every aspect of the present disclosure. Rather, the foregoing summary merely provides an exemplification of some of the novel concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
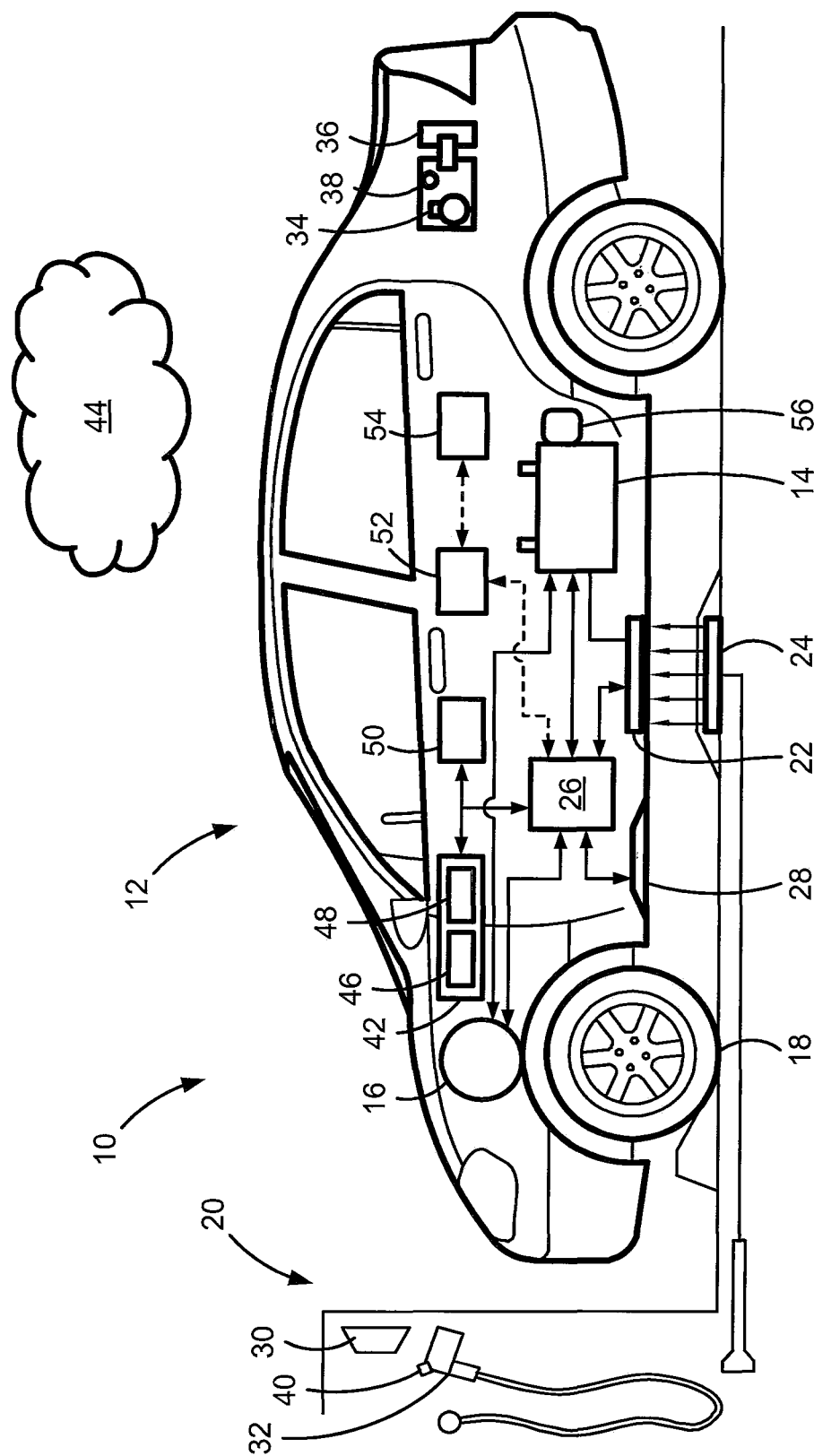
FIG. 1 is a partially schematic, side-view illustration of a representative electric-drive motor vehicle with a network of in-vehicle controllers, sensing devices, and communication devices for executing intelligent vehicle tow operations in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein in the sense of "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle, when the vehicle is operatively oriented on a horizontal driving surface.

Referring now to the drawings, wherein like reference numbers refer to like features throughout the several views, there is shown in FIG. 1 a schematic illustration of a representative automobile, which is designated generally at 10 and portrayed herein for purposes of discussion as a sedan-style, hybrid electric or full electric ("electric-drive") passenger vehicle. Packaged within a vehicle body 12 of the automobile 10, e.g., inside a passenger compartment, trunk compartment, or dedicated battery compartment, is a traction battery pack 14 that powers one or more electric motor-generators 16 that drive one or more of the vehicle's road wheels 18 to thereby propel the vehicle 10. The illustrated automobile 10—also referred to herein as "motor vehicle" or "vehicle" for short—is merely an exemplary application with which aspects and features of this disclosure may be practiced. In the same vein, implementation of the present concepts for the specific electric-drive powertrain architecture presented in the drawings should also be appreciated as an exemplary application of the disclosed concepts and features. As such, it will be understood that aspects and features of this disclosure may be applied to other powertrain architectures, and implemented for any logically relevant type of motor vehicle. Moreover, only select components of the motor vehicle and vehicle drive system have been shown and will be described in additional detail herein. Nevertheless, the vehicles and systems discussed below may include numerous additional and alternative features, and other commercially available peripheral components, for example, to carry out the various protocols and algorithms of this disclosure.

FIG. 1 is a simplified illustration of the electric-drive vehicle 10 docked at and operably coupled to a vehicle charging station 20 for recharging an onboard rechargeable energy source, such as a high-voltage direct current (DC) traction battery pack 14. Traction battery pack 14 may take on many suitable configurations, including an array of lead-acid, lithium-ion, or other applicable type of rechargeable electric vehicle batteries (EVB). To provide an operable coupling between the traction battery pack 14 and vehicle charging station 20, the vehicle 10 may include an inductive charging component 22, e.g., with an integrated induction coil, that is mounted to the underside of the vehicle body 12. This inductive charging component 22 functions as a wireless charging interface that is compatible with a wireless charging pad or platform 24, e.g., with an internal EMF coil, of the vehicle charging station 20. In the illustrated example, the wireless charging pad/platform 24 is located on the floor of the vehicle charging station 20, positioned in accordance with a "target location" that serves as a desired parking location for purposes of efficient and effective wireless charging of the vehicle 10. In particular, FIG. 1 depicts the vehicle 10 parked in proper fore-aft alignment and in proper starboard-port alignment that helps to ensure the inductive charging component 22 is substantially aligned in both lateral and longitudinal dimensions with the wireless charging pad 24.

The vehicle charging station 20 may employ any heretofore and hereinafter developed type of wired and/or wireless charging technology, including inductive charging, radio charging, and resonance charging, as some non-limiting examples. In accordance with electromagnetic induction charging technology, the representative wireless charging pad 24 of FIG. 1 may be activated with electric current to generate an alternating electromagnetic field proximate the inductive charging component 22. This magnetic field, in turn, induces an electric current in the inductive charging component 22 of the vehicle 10. The induced current may be filtered, stepped-down, and/or phase-shifted by in-vehicle electrical modulation circuitry to charge the traction battery pack 14 or other energy source of the vehicle 10 (e.g., a standard 12V lead-acid starting, lighting, and ignition (SLI) battery, an auxiliary power module, etc.). Optimal wireless charging performance may be obtained when the vehicle 10 is aligned with the charging station 20 such that the maximum available EMF force is transferred by the wireless charging pad 24 to the inductive charging component 22. A pack cooling system 56 may be attached to or integrated within an outer housing of the traction battery pack 14 and provides substantially uniform cooling of the modules within the pack, e.g., by providing a metered flow of coolant fluid.

Traction battery pack 14 stores energy that can be used for propulsion by the electric machine(s) 16 and for operating other vehicle electrical systems. The traction battery pack 14 is communicatively connected (wired or wirelessly) to one or more vehicle controllers, represented in FIG. 1 by electronic control unit (ECU) 26, that regulates the operation of various onboard vehicle components. Contactors controlled by the ECU 26, for example, may isolate the traction battery pack 14 from other components when opened, and connect the traction battery pack 14 to other components when closed. The ECU 26 is also communicatively connected to each electric motor-generator unit (MGU) 16 to control, for example, bi-directional transfer of energy between the traction battery pack 14 and MGU 16. For instance, traction battery pack 14 may provide a DC voltage while the motor-generator(s) 16 may operate using a three-phase AC current; in such an instance, ECU 26 converts the DC voltage to a three-phase AC current for use by the motor-generator(s) 16. In a regenerative mode where the electric machine(s) 16 act as generators, the ECU 26 may convert three-phase AC current from the motor-generator(s) 16 to DC voltage compatible with the traction battery pack 14. The representative ECU 26 is also shown communicating with charging component 22, for example, to condition the power supplied from the vehicle charging station 20 to the battery pack 14 to help ensure proper voltage and current levels. The ECU 26 may also interface with the charging station 20, for example, to coordinate the delivery of power to and from the vehicle 10.

Vehicle charging station 20 of FIG. 1 also offers wired charging for electric vehicle 10 via a "plug-in" electrical connector 32, which may be one of a number of different commercially available electrical connector types. By way of non-limiting example, electrical connector 32 may be a Society of Automotive Engineers (SAE) J1772 (Type 1) or J1772-2009 (Type 2) electrical connector with single or split phase modes operating at 120 to 240 volts (V) with alternating current (AC) at up to 80 amperes (A) peak current for conductive vehicle charging. Furthermore, the charging connector 32 can also be designed to meet the standards set forth in International Electrotechnical Commission (IEC) 62196-3 Fdis and/or IEC 62196-2, as well as any other presently available or hereinafter developed standards. A charge port 34 accessible on the exterior of vehicle body 12 is a wired charging interface functioning as an electrical inlet into which electrical connector 32 may be plugged or otherwise mated. This port 34 enables a user to easily connect and disconnect electric vehicle 10 to/from a readily available AC or DC source, such as a public utility power grid, via charging station 20. Charge port 34 of FIG. 1 is not limited to any particular design, and may be any type of inlet, port, connection, socket, plug, etc., that enables conductive or other types of electrical connections. A hinged charge port door (CPD) 36 on vehicle body 12 can be selectively opened and closed to access and cover the charge port 34, respectively.

As part of the vehicle charging process, the electric-drive vehicle 10 may monitor wired/wireless charging availability, wireless power quality, and other related issues that may affect vehicle charging. According to the illustrated example, the vehicle ECU 26 of FIG. 1 communicates with and receives sensor signals from a monitoring system, represented herein by one or more onboard "resident" sensing devices 28 of the vehicle 10 and/or one or more off-board "remote" sensing devices 30 of the vehicle charging station 20. In practice, this monitoring system may include a single sensor, or it may include a distributed sensor architecture with an assortment of sensors packaged at similar or alternative locations to that which are shown in the drawings. A CPD sensor 38 mounted by the charge port 34 may sense, and be polled or read by the vehicle's ECU 26 to determine, a door status (open/closed) of the CPD 36. As another option, a latching button 40, which helps to physically attach and secure the electrical connector 32 to the charge port 34, may include an internal switch (e.g., an SAE S3 type switch) that functions as a sensing device to detect whether or not the electrical connector 32 is operatively connected to the charge port 34.

The representative vehicle 10 of FIG. 1 may be originally equipped with a vehicle telecommunication and information ("telematics") unit 42 that wirelessly communicates (e.g., via cell towers, base stations and/or mobile switching centers (MSCs), etc.) with a remotely located or "off-board" cloud computing service system 44. Acting as both a user-input device and a vehicle-output device, telematics unit 42 may be equipped with an electronic video display device 46 and assorted input controls 48 (e.g., buttons, knobs, switches, trackpads, keyboards, touchscreens, etc.). These telematics hardware components may function, at least in part, as a resident vehicle navigation system, e.g., to enable assisted and/or automated vehicle navigation, and as a human/machine interface (HMI), e.g., to enable a user to communicate with the telematics unit 42 and other systems and system components of the vehicle 10. Optional peripheral hardware may include a microphone that provides a vehicle occupant with the ability to input verbal or other auditory commands; the vehicle 10 may be equipped with an embedded voice-processing unit programmed with a computational speech recognition software module. A vehicle audio system with one or more speaker components may provide audible output to a vehicle occupant and may be either a stand-alone device dedicated for use with the telematics unit 42 or may be part of a general audio system.

With continuing reference to FIG. 1, telematics unit 42 is an onboard computing device that provides a mixture of services, both individually and through its communication with other networked devices. Telematics unit 42 may be generally composed of one or more processors, each of which may be embodied as a discrete microprocessor, an application specific integrated circuit (ASIC), a dedicated control module, etc. Vehicle 10 may offer centralized vehicle control via ECU 26 that is operatively coupled to one or more electronic memory devices 50, each of which may take on the form of a CD-ROM, magnetic disk, IC device, semiconductor memory (e.g., various types of RAM or ROM), etc., with a real-time clock (RTC). Long-range vehicle communication capabilities with remote, off-board networked devices may be provided via one or more or all of a cellular chipset/component, a navigation and location chipset/component (e.g., global positioning system (GPS) transceiver), or a wireless modem, all of which are collectively represented at 52. Close-range wireless connectivity may be provided via a short-range wireless communication device (e.g., a BLUETOOTH® unit or near field communications (NFC) transceiver), a dedicated short-range communications (DSRC) component, and/or a dual antenna, all of which are collectively represented at 54. The various communications devices described above may be configured to exchange data as part of a periodic broadcast in a Vehicle-to-Vehicle (V2V) communication system or a vehicle-to-everything (V2X) communication system, e.g., Vehicle-to-Infrastructure (V2I), Vehicle-to-Pedestrian (V2P), Vehicle-to-Device (V2D), etc.

Figure 2:
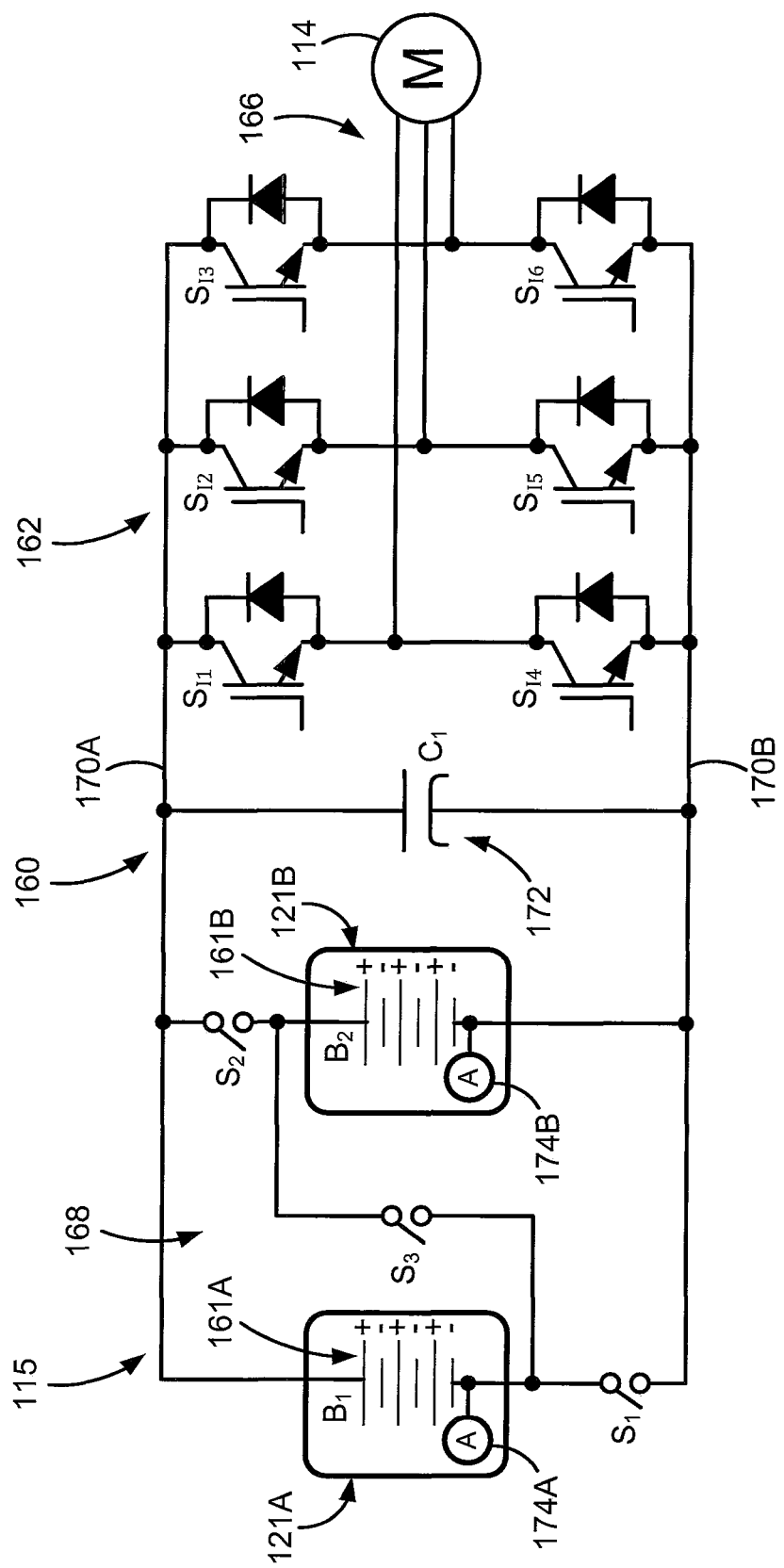
FIG. 2 is a schematic diagram illustrating a representative vehicle drive system with multiple traction battery packs connected to a motor/generator unit via a high-voltage main DC bus, DC bulk capacitor, and power inverter module in accordance with aspects of the present disclosure.

Turning next to FIG. 2, there is shown a representative vehicle drive system with an onboard rechargeable energy storage system (RESS) 115 that is adapted for storing high-voltage electrical energy used for propelling an electric-drive vehicle, such as battery electric vehicle 10 of FIG. 1. RESS 115 may be a deep-cycle, high-ampere capacity battery system rated for approximately 400 to 800 VDC or more, for example, depending on a desired vehicle range, gross vehicle weight, and power ratings of the various loads drawing electrical power from the RESS 115. To this end, the RESS 115 may include multiple high-voltage, independently-rechargeable battery packs 121A and 121B that are selectively electrically connectable to one or more polyphase electric machines, such as a three-phase permanent magnet (PM) traction motor (M) 114. While two traction battery packs 121A, 121B and one traction motor 114 are shown in FIG. 2 for illustrative simplicity, a single traction battery pack or three or more traction battery packs may be used within RESS 115 to power any number of electric traction motors.

The first (B1) and second (B2) traction battery packs 121A, 121B may be connected in electrical parallel with respect to a high-voltage main DC bus 160 and a power inverter module 162 for governing the transmission of electrical energy to and from the traction motor 114. Each pack 121A, 121B comes equipped with a respective stack 161A and 161B of battery cells, including lithium ion cells, lithium polymer cells, or any other rechargeable electrochemical cells providing a sufficiently high-power density, as well as any requisite conductive battery support structure, battery pack cooling system, and current conditioning hardware. The number and arrangement of battery cells 161A, 161B in each pack 121A, 121B may vary with the intended application of the RESS 115, for instance with 96 or more such cells per pack used in certain high-voltage applications. Although differing in appearance, the representative vehicle drive system of FIG. 2 may include any of the options and features described above with respect to the vehicle drive system of FIG. 1, and vice versa.

A DC-to-AC and AC-to-DC power inverter module 162, which may be part of a transmission power inverter module (TPIM), connects via polyphase windings 166 to traction motor 114 to transmit electrical energy between the motor 114 and battery packs 121A, 121B. The power inverter module 162 may incorporate multiple power inverters and respective motor control modules operable to receive motor control commands and control inverter states therefrom for providing motor drive or regenerative functionality. The power inverter module 162 may comprise a set of semiconductor switches $S_{I1}$-$S_{I6}$ (also referred to herein as "inverter switches") that cooperatively convert direct current power from the energy storage devices—battery packs 121A, 121B—to alternating current power for powering the electric machine 114 via high-frequency switching. Each semiconductor switch $S_{I1}$-$S_{I6}$ may be embodied as a voltage-controlled bipolar switching device in the form of insulated gate bipolar transistor (IGBT), metal-oxide semiconductor field effect transistor (MOSFET), wideband GaN device (WBG), or other suitable switch having a corresponding gate to which a gate signal is applied to change the on/off state of a given switch. There is typically at least one semiconductor switch for each phase of a three-phase electric machine.

The traction battery packs 121A, 121B include a set 168 of solid-state relay switches or contactors S1-S3 (also referred to herein as "pack contactor switches") that are independently responsive to signals from a suitable controller or dedicated control module to govern the electrical output of the battery system. Contactors/switches S1-S3 are adapted to close under electrical load so as to ensure the instantaneous or near instantaneous delivery of electrical power to the vehicle's propulsion system and to drive any number of in-vehicle accessories. As with the semiconductor inverter switches within the power inverter module 162, pack contactor switches 168 may be constructed of highly efficient switching devices, such as wide-gap gallium nitride (GaN) or silicon carbide (SiC) MOSFETs, IGBTs, or other suitable electronic devices. Respective real-time electrical currents of the traction battery pack 121A, 121B of FIG. 2 may be measured using dedicated current sensors (A) 174A and 174B, which may be integrated within a battery housing of a corresponding battery pack.

A DC output voltage of the traction battery packs 121A, 121B is delivered across positive and negative voltage bus rails 170A and 170B, respectively, with a fixed-type, high-frequency DC bulk capacitor (C1) 172 placed in electrical parallel with both traction battery packs 121A, 121B. The high-frequency DC bulk capacitor 172 is portrayed in FIG. 2 as a single device for ease of illustration. It should be appreciated, however, that the DC bulk capacitor 172 may be composed of multiple capacitor devices that are electrically arranged in series, parallel, or any other suitable electrical configuration to provide electrical capacitance in the electric circuit between the positive and negative conductors of the high-voltage main DC bus 160. An RESS sensing system (not shown) may be arranged to monitor operating parameters of the main DC bus 160 and bulk capacitor 172, such as a bus electrical potential measured across the positive and negative bus rails 170A and 170B of the high-voltage main DC bus 160.

Capacitor size of the DC bulk capacitor 172 may be described in terms of its total capacitance, and may be selected based upon any number of variables, including expected voltage range, peak current, and ripple voltage amplitude across the main DC bus 160. In this regard, capacitance of a bulk capacitor may also be determined in relation to parameters such as peak voltage, root mean square (RMS) current, minimum and maximum bus current levels, operating temperatures, and other factors. As such, the size of the DC bulk capacitor 172, in terms of its total capacitance, may be selected based upon expected DC bus voltage ripple when operating the power inverter module 162 employing, for example, a six-step mode of operation. As yet another option, the DC bulk capacitor 172 may take on the form of any suitable electrical capacitive storage device, be it electrolytic devices, aluminum devices, ceramic devices, plastic capacitance devices, wound film devices, etc. Furthermore, the conductive material employed by each capacitor device may comprise any suitable electrically conductive material, such as aluminum, copper, gold, zinc, or an alloy or composite of the foregoing metallic materials.

Flat-towing or incline-towing an electric-drive vehicle 10 such that the motor-driven road wheels 18 are in contact with the ground may result in spinning of an open-circuited or close-circuited E-machine, such as MGU 16 (FIG. 1) or PM traction motor 114 (FIG. 2). Doing so may inadvertently generate an extremely high voltage and current, e.g., if the PIM switches $S_{I1}$-$S_{I6}$ are closed, induce a large back EMF, e.g., if the PIM switches $S_{I1}$-$S_{I6}$ are open, and cause thermal runaways, e.g., if the pack cooling system 56 is disabled. If the electric powertrain components are electrically disconnected from the in-vehicle battery pack during towing, for example, the induced back EMF due to machine speed may overcharge the DC bulk capacitor 172 which, in turn, may damage the PIM 162 and other power electronics. Conversely, if the electric powertrain components are electrically connected to the battery pack during towing, the drive system may enter an uncontrolled regenerative charging state that overcharges the battery and overheats the motor when the E-machine stator is driven to high speeds (e.g., above 6000 rpm).

Discussed below are comprehensive tow features for protecting the drive system components of an electric-drive vehicle under towing. Comprehensive tow features with automated vehicle system control may be dependent upon the host vehicle's drive system architecture, real-time drive system conditions, real-time vehicle dynamics data, operator feedback, etc. Different user-selectable options may be presented to a driver, occupant, or owner of the host vehicle to enable heightened or targeted drive system protection, torque assist, and/or energy recovery. During a vehicle towing operation in which the drive system experiences a failure, such as damage to the electric drive unit or electrical system hardware, the traction battery pack is operatively disconnected from the electric-drive powertrain components, e.g., via open or short circuit mode, if available. As yet a further option, the traction motor may be manually disconnected from the power inverter, e.g., via a hand-operated electrical switch. Alternatively, the motor may be mechanically disconnected from the vehicle's drive wheels, e.g., via a disconnect clutch. An optional NO TOWING warning may be displayed by the vehicle telematics unit 42, e.g., if the motor or PIM is damaged or no physical disconnect option is available.

On the other hand, during a vehicle towing operation in which there is a fully functional drive system, the traction battery pack is operatively connected to the electric-drive powertrain components. Concomitantly, if tow speed of the host vehicle and, thus, the traction motor is below a vehicle-calibrated base speed, the PCM commands the PIM to open-circuit the traction motor while maintaining motor speed monitoring. In this instance, it is expected that there is a negligible level of current and torque being generated in the drive system. If, however, the vehicle/motor speed is greater than the calibrated base speed, the traction motor may be shorted to a three-phase operating state (e.g., with shortened three-phase control) while maintaining thermal protection. Optional features with a functional drive system may include regenerative charging of the battery pack with cooling support based on battery state of charge (SOC), and torque assist for the towing vehicle via the host vehicle with system regulated cooling (e.g., if rear-wheel drive (RWD) is functional).

Figure 3:
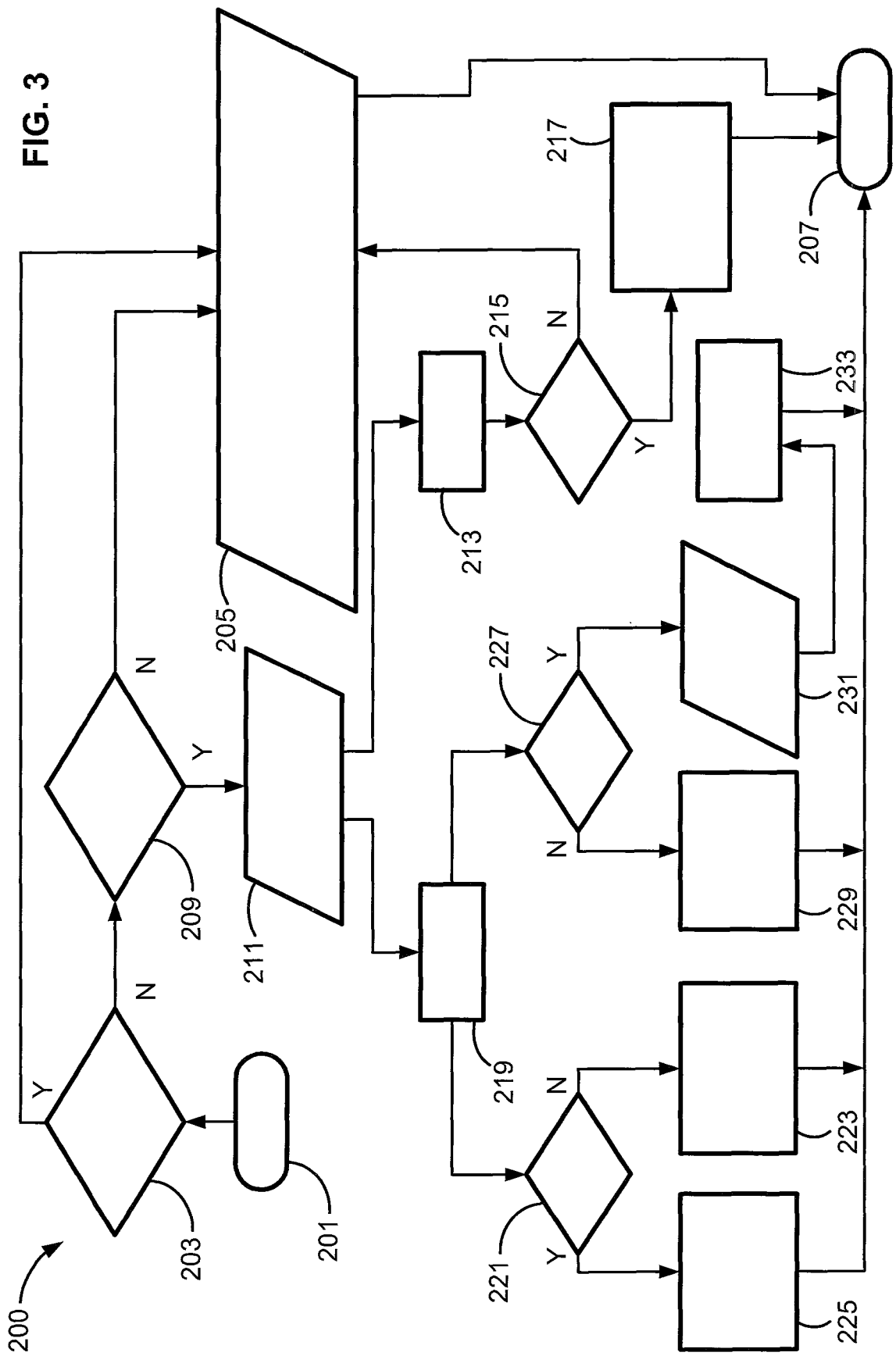
FIG. 3 is a flowchart illustrating a representative vehicle tow protocol for protecting an electric-drive vehicle's powertrain and electrical components during a towing operation, which may correspond to memory-stored instructions executed by an onboard or remote controller, control-logic circuitry, programmable electronic control unit, or other integrated circuit (IC) device or a network of IC devices in accord with aspects of the disclosed concepts.

With reference next to the flow chart of FIG. 3, an improved vehicle tow method or control strategy for automating operation of an electric drive system, such as RESS 115, PIM 162 and PM traction motor 114 of FIG. 2, of an electric-drive vehicle, such as vehicle 10 of FIG. 1, is generally described at 200 in accordance with aspects of the present disclosure. Some or all of the operations illustrated in FIG. 3 and described in further detail below may be representative of an algorithm that corresponds to processor-executable instructions that may be stored, for example, in main or auxiliary or remote memory, and executed, for example, by an on-board or off-board controller, processing unit, control logic circuit, or other module or device or network of modules/devices, to perform any or all of the above or below described functions associated with the disclosed concepts. It should be recognized that the order of execution of the illustrated operation blocks may be changed, additional blocks may be added, and some of the blocks described may be modified, combined, or eliminated.

Method 200 begins at terminal block 201 of FIG. 3 with processor-executable instructions for a programmable controller or control module or similarly suitable processor to call up an initialization procedure for a real-time vehicle towing protocol for protecting an electric-drive vehicle's powertrain and electrical components during a towing operation. This routine may be executed in real-time, continuously, systematically, sporadically, and/or at regular intervals, for example, each 100 milliseconds, during active or autonomous vehicle operation. As yet another option, block 201 may initialize responsive to a user prompt from an occupant of the vehicle or a broadcast prompt signal from a backend or middleware computing node tasked with collecting, analyzing, sorting, storing and distributing vehicle data. To carry out this protocol, a vehicle control system or any combination of one or more subsystems may be operable to receive, process, and synthesize pertinent information and inputs, and execute control logic and algorithms to regulate various powertrain system, steering system, brake system, fuel system, and/or battery system components to achieve desired control targets. As a non-limiting example, a driver of host vehicle 10 or an operator of an integrated tow truck (not shown) may activate a vehicle towing mode, e.g., via telematics unit 42 of other similarly suitable HMI, that transmits one or more electronic signals to ECU 26 indicating commencement of or the intent to commence a towing operation for a host vehicle.

Advancing from terminal block 201 to decision block 203, the method 200 of FIG. 3 ascertains whether or not there is an existing drive system failure in the host vehicle that is preventing the powertrain's traction motor(s) from electrically connecting with the RES S's traction battery pack(s). For instance, the electric-drive vehicle 10 of FIG. 1 may have been involved in a collision that damaged the electrical junctions on the motor housing of the MGU 16. In the same vein, the PIM 162 of FIG. 2 may have experienced an electrical fault causing one or more of the semiconductor switches $S_{f1}$-$S_{f6}$ to fail. System failure and fault detection may be achieved via a vehicle diagnostic/prognostic protocol embedded within the resident memory of the vehicle ECU 26. Conversely, the vehicle tow operation may not be the result of an impaired host vehicle; consequently, there is no existing damage to the drive system components. As an example, the vehicle may be towed as part of a recreational endeavor or merely for purposes of shipping the vehicle.

Upon determining that a system fault is in fact present (Block 203=YES), method 200 of FIG. 3 proceeds to input/output block 205 to execute various protectionary features to prevent further damage to the vehicle being towed. A vehicle HMI, such as telematics unit 42 of FIG. 1, for example, may display or recite operating instructions and/or towing restrictions to the driver of the towed or towing vehicle. Output information may include, for example, instructions for operatively disconnecting the traction motor from the onboard battery pack and/or vehicle drive wheels. The displayed/recited restrictions may further include a warning to maintain a vehicle tow speed that is equal to or less than a predetermined threshold speed. Input/output block 205 may further comprise transmitting command signals to the PIM 162 to automate electrically disconnecting the PM traction motor 114 from the battery packs 121A, 121B. In addition, or alternatively, command signals may be sent to a PCM to mechanically disconnect the motor 114 from the vehicle's motor-driven wheels. Once these measures are completed, the method 200 of FIG. 3 may advance from input/output block 205 to terminal block 207 and terminate, or may loop back to terminal block 201 and run in a continuous loop.

For scenarios in which the vehicle tow method 200 concludes that there are no significant system failures preventing operation of the vehicle's electric drive system (Block 203=NO), method 200 of FIG. 3 advances from decision block 203 to decision block 209. At block 209 it is determined if, during the towing operation of the electric-drive vehicle, a real-time motor speed of the host vehicle's traction motor exceeds a motor-calibrated base speed. By way of non-limiting example, the aforesaid base speed may be set in a memory-stored calibration table as a bench-tested stator speed (e.g., rotational speed of 6000 rpm) at which a non-negligible amount of current is generated by electromotive force (EMF). If the real-time motor speed is below the calibrated base speed (Block 209=NO) such that an insignificant amount of torque and voltage is being generated during towing, method 200 proceeds to input/output block 205, open-circuits the vehicle's traction motor(s), carries out any of the features described above with respect to process block 205, then moves to terminal block 207.

The method 200—upon concluding that the motor's towed speed does exceed the motor-calibrated base speed (Block 209=YES)—outputs one or more user-selectable options via a suitable HMI at input/output block 211. In accord with the illustrated example, the in-vehicle telematics unit 42 prompts the driver or occupant or tow-truck driver to choose between an active tow mode and a passive tow mode. Upon receiving an input signal from telematics unit 42 indicative of a user selection of the passive tow mode at process block 213, the method 200 initiates a passive tow mode protocol, contemporaneously implements a 3-phase short circuit, and then continues to decision block 215. Decision block 215 provides processor-executable instructions for ECU 26 to ascertain whether or not a real-time battery SOC of the traction battery pack 14 is greater than a battery-calibrated SOC threshold. If it is not (Block 215=NO), method 200 advances once again to input/output block 205, then terminal block 207, and carries out any of the associated functions described above. Conversely, the ECU 26 may conclude that the battery SOC is greater than the calibrated SOC (Block 215=YES); ECU 26 responsively carries out the processor-executable instruction of process block 217 by initializing an E-drive system protection mode, e.g., maintaining sufficient cooling of the motor and battery, restricting tow vehicle speed, etc. Method 200 thereafter transitions from decision block 215 to terminal block 207.

In response to receiving an input signal from vehicle telematics unit 42 indicative of a user selection of the active tow mode at process block 219, the method 200 initiates an active tow mode protocol, contemporaneously implements a towing torque assist operation or a towing power generation operation (both subject to battery SOC), and concomitantly continues to decision block 221 or decision block 227. While shown as two mutually discrete operations, it is envisioned that a towed vehicle may provide active torque assist and, when desired, switch back-and-forth to active regenerative charging. Prior to activating the towing torque assist operation, decision block 221 provides processor-executable instructions for ECU 26 to ascertain whether or not a real-time battery SOC of the traction battery pack 14 is greater than a battery-calibrated SOC threshold. In this instance, the SOC threshold may be a pack-specific acceptable minimum SOC that will ensure the traction battery pack can provide sufficient power to carry out, yet will not be damaged from, providing torque assist by the host vehicle to the towing vehicle during the tow operation. If pack SOC is less than threshold SOC (Block 221=NO), ECU 26 commands telematics unit 42 to provide a visual and/or audible warning (e.g., via video display device 46) that torque assist is not available, as indicated at process block 223. Contrariwise, if pack SOC is greater than threshold SOC (Block 221=YES), ECU 26 executes the instructions of process block 225 and thereby commands a vehicle power inverter (e.g., PIM 162 of FIG. 2) via a resident PCM to commence a controller-governed torque assist, which may be limited to a measured or estimated road load. Method 200 thereafter transitions from decision block 215 to terminal block 207.

With continuing reference to FIG. 3, the method 200 may optionally proceed from process block 219 to decision block 227 with processor-executable instructions for the ECU 26 to ascertain whether or not a real-time battery SOC of the traction battery pack 14 is less than a battery-calibrated SOC threshold. For this inquiry, the calibrated SOC threshold may be set as a maximum battery pack SOC that is available from a corresponding battery spec. This maximum battery pack SOC may be set to mitigate overheating or overcharging the pack, and avoid welding shut any of the pack contactor switches, while maintaining an acceptable charge current and rate. Responsive to the pack SOC being equal to or greater than the threshold SOC (Block 227=NO), ECU 26 executes the instructions of process block 229 and thereby commands telematics unit 42 to provide a visual and/or audible warning that regenerative charging of the traction battery pack is presently unavailable for this particular tow operation. If, however, pack SOC is below threshold SOC (Block 227=YES), ECU 26 commands the vehicle power inverter via a resident BCM to begin regenerative charging through EMF-generated power during vehicle towing, as indicated at input/output block 231. Motor-level, speed-based "E-drive" control is provided during regenerative charging at process block 233. Method 200 thereafter transitions from decision block 215 to terminal block 207.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method for controlling operation of an electric-drive vehicle during towing, the electric-drive vehicle including a vehicle controller, a traction motor, a traction battery pack, and an electrical system with power electronics and a power inverter, the method comprising:
   receiving, via the vehicle controller, an electronic tow signal indicating initiation of a towing operation for the electric-drive vehicle;
   determining, via the vehicle controller responsive to the received electronic tow signal, whether or not a drive system failure exists, the drive system failure preventing the traction motor from electrically connecting with the traction battery pack;
   determining, via the vehicle controller responsive to a determination that the drive system failure does not exist, whether or not a towed motor speed of the traction motor during the towing operation of the electric-drive vehicle exceeds a calibrated base speed;
   transmitting, via the vehicle controller responsive to a determination that the towed motor speed exceeds the calibrated base speed, a connect command signal to the power inverter to electrically connect the traction motor to the power electronics and/or the traction battery pack; and
   transmitting, via the vehicle controller responsive to a determination that the towed motor speed does not exceed the calibrated base speed, a disconnect command signal to the power inverter to electrically disconnect the traction motor from the power electronics and/or the traction battery pack.

2. The method of claim 1, wherein the connect command signal includes: a short signal shorting the traction motor into multi-phase operation via the power inverter; and a cool signal initiating a thermal protection protocol cooling the traction battery pack via a pack cooling system.

3. The method of claim 1, wherein the disconnect command signal includes multiple open circuit signals opening a plurality of solid-state relay switches of the power inverter.

4. The method of claim 1, further comprising transmitting, via the vehicle controller responsive to the determination that the towed motor speed exceeds the calibrated base speed, a charging signal to a battery control module to initiate regenerative charging of the traction battery pack via the traction motor during the towing operation.

5. The method of claim 4, further comprising determining, via the vehicle controller, whether or not a pack state of charge (SOC) of the traction battery pack is less than a calibrated SOC threshold, wherein transmitting the charging signal is further in response to a determination that the pack SOC is less than the calibrated SOC threshold.

6. The method of claim 5, further comprising modulating, responsive to the determination that the pack SOC is less than the calibrated SOC threshold, the regenerative charging of the traction battery pack to a calibrated maximum power input level.

7. The method of claim 1, further comprising transmitting, via the vehicle controller responsive to the determination that the towed motor speed exceeds the calibrated base speed, a torque signal to a powertrain control module to initiate a torque assist output via the traction motor during the towing operation.

8. The method of claim 7, further comprising determining, via the vehicle controller, whether or not a pack state of charge (SOC) of the traction battery pack exceeds a calibrated SOC threshold, wherein transmitting the torque signal is further in response to a determination that the pack SOC exceeds the calibrated SOC threshold.

9. The method of claim 1, further comprising:
   determining, via the vehicle controller, whether a pack state of charge (SOC) of the traction battery pack is less than or greater than a calibrated SOC threshold;
   transmitting, responsive to the pack SOC being greater than the calibrated SOC threshold, a warning signal indicating unavailability of regenerative charging of the traction battery pack during the towing operation; and
   transmitting, responsive to the pack SOC being less than the calibrated SOC threshold, a warning signal indicating unavailability of torque assist via the traction motor during the towing operation.

10. The method of claim 1, further comprising transmitting, via the vehicle controller responsive to a determination that the drive system failure does exist, the disconnect command signal to the power inverter to electrically disconnect the traction motor from the traction battery pack.

11. The method of claim 1, further comprising transmitting, via the vehicle controller responsive to a determination that the drive system failure does exist, a prompt signal to electrically disconnect the traction motor from the traction battery pack via a manual electrical switch.

12. The method of claim 1, further comprising transmitting, via the vehicle controller responsive to a determination that the drive system failure does exist, a prompt signal to mechanically disconnect the traction motor from a road wheel of the electric-drive vehicle.

13. The method of claim 1, further comprising, responsive to a determination that the drive system failure does not exist:
   transmitting, via the vehicle controller to a human-machine interface (HMI) of the electric-drive vehicle, a notification signal to prompt a driver of the electric-drive vehicle to select from an active tow control mode and a passive tow control mode; and
   receiving, via the vehicle controller from the HMI, a request signal indicative of a selection by the driver from the active tow control mode and the passive tow control mode.

14. The method of claim 13, further comprising, responsive to the request signal indicating the driver selected the passive tow control mode:
   determining, via the vehicle controller, whether or not a pack state of charge (SOC) of the traction battery pack exceeds a calibrated SOC threshold; and
   transmitting, responsive to a determination that the pack SOC exceeds the calibrated SOC threshold, a cool signal initiating a thermal protection protocol of the traction battery pack via a pack cooling system.

15. An electric-drive vehicle comprising:
   a vehicle body with a plurality of road wheels attached to the vehicle body;
   a vehicle powertrain with a traction motor attached to the vehicle body and configured to drive one or more of the road wheels to thereby propel the electric-drive vehicle;
   a high-voltage electrical system with a traction battery pack operable to power the traction motor, power electronics operable to control operation of the traction battery pack, and a power inverter operable to selectively electrically connect the traction battery pack to the traction motor; and
   a vehicle controller attached to the vehicle body and programmed to:

receive an electronic tow signal indicating initiation of a towing operation for the electric-drive vehicle;

responsive to the received electronic tow signal, determine whether or not a drive system failure exists thereby preventing the traction motor from electrically connecting with the traction battery pack;

responsive to the drive system failure not existing, determine whether or not a towed motor speed of the traction motor during the towing operation of the electric-drive vehicle exceeds a calibrated base speed;

responsive to the towed motor speed exceeding the calibrated base speed, transmit a connect command signal to the power inverter to electrically connect the traction motor to the power electronics and/or the traction battery pack; and responsive to the towed motor speed not exceeding the calibrated base speed, transmit a disconnect command signal to the power inverter to electrically disconnect the traction motor from the power electronics and/or the traction battery pack.

16. The motor vehicle of claim 15, wherein the connect command signal includes: a short signal shorting the traction motor into multi-phase operation via the power inverter; and a cool signal initiating a thermal protection protocol cooling the traction battery pack via a pack cooling system.

17. The motor vehicle of claim 15, wherein the disconnect command signal includes multiple open circuit signals opening a plurality of solid-state relay switches of the power inverter.

18. The motor vehicle of claim 17, wherein the vehicle controller is further programmed to transmit, responsive to the drive system failure existing, the disconnect command signal to the power inverter to thereby electrically disconnect the traction motor from the traction battery pack.

19. The motor vehicle of claim 15, wherein the vehicle controller is further programmed to transmit, responsive to the drive system failure existing, a prompt signal to mechanically disconnect the traction motor from the one or more of the road wheels.

20. The motor vehicle of claim 15, wherein the vehicle controller is further programmed to:

determine whether a pack state of charge (SOC) of the traction battery pack is less than or greater than a calibrated SOC threshold;

responsive to the pack SOC being greater than the calibrated SOC threshold, transmit a warning signal indicating unavailability of regenerative charging of the traction battery pack during the towing operation; and responsive to the pack SOC being less than the calibrated SOC threshold, transmit a warning signal indicating unavailability of torque assist via the traction motor during the towing operation.

* * * * *